(12) United States Patent
Dutheil et al.

(10) Patent No.: US 10,480,455 B2
(45) Date of Patent: Nov. 19, 2019

(54) CRYOGENIC CIRCUIT CONDITIONING SYSTEM

(71) Applicant: AIRBUS DEFENCE AND SPACE SAS, Les Mureaux (FR)

(72) Inventors: Jean-Phillipe Dutheil, Martignas-sur-Jalle (FR); Marie-Sophie Hameury, Boulogne Billancourt (FR)

(73) Assignee: ARIANEGROUP SAS, Paris (FR)

( * ) Notice: Subject to any disclaimer, the term of this patent is extended or adjusted under 35 U.S.C. 154(b) by 0 days.

(21) Appl. No.: 14/762,239

(22) PCT Filed: Jan. 21, 2014

(86) PCT No.: PCT/EP2014/051099
§ 371 (c)(1),
(2) Date: Jul. 21, 2015

(87) PCT Pub. No.: WO2014/114628
PCT Pub. Date: Jul. 31, 2014

(65) Prior Publication Data
US 2015/0345428 A1    Dec. 3, 2015

(30) Foreign Application Priority Data

Jan. 22, 2013  (FR) .................................... 13 50561

(51) Int. Cl.
*F25D 21/12* (2006.01)
*F02K 9/60* (2006.01)
(Continued)

(52) U.S. Cl.
CPC ................ *F02K 9/60* (2013.01); *B64G 1/401* (2013.01); *B64G 1/402* (2013.01); *F02K 9/78* (2013.01);
(Continued)

(58) Field of Classification Search
CPC ........ B64D 13/02; B64D 13/06; B64D 13/04; B64D 13/006; B64G 1/401; B64G 1/402;
(Continued)

(56) References Cited

U.S. PATENT DOCUMENTS 2,959,023 A    11/1960   Webster
3,093,348 A *  6/1963   Schelp .................... B64C 30/00
                                                          102/378
(Continued)

FOREIGN PATENT DOCUMENTS

EP    2354622    8/2011
FR    2907422    10/2006
GB    2196393    4/1988

OTHER PUBLICATIONS

International Search Report, International Application No. PCT/EP2014/051099, dated Jul. 7, 2014.

*Primary Examiner* — Henry T Crenshaw
*Assistant Examiner* — Kamran Tavakoldavani
(74) *Attorney, Agent, or Firm* — Gottlieb, Rackman & Reisman, PC

(57) ABSTRACT

The subject of the invention is a device for the in-flight conditioning of equipment of cryogenic circuits of an aircraft, which device includes means for bleeding air from outside the aircraft, means for extracting nitrogen from this air using a nitrogen separator of the OBIGGS type and means for distributing this nitrogen around the equipment. The device notably includes means for distributing nitrogen around the various pieces of equipment of cryogenic circuits using a system of piping provided with calibrated orifices.

16 Claims, 2 Drawing Sheets

(51) Int. Cl.
*F25D 21/04* (2006.01)
*B64G 1/40* (2006.01)
*F02K 9/78* (2006.01)
*B64G 1/00* (2006.01)

(52) U.S. Cl.
CPC .............. *F25D 21/04* (2013.01); *B64G 1/002* (2013.01); *F05D 2260/608* (2013.01)

(58) Field of Classification Search
CPC ... B64G 1/403; F02C 6/08; F02C 7/26; F02C 7/32
See application file for complete search history.

(56) References Cited

U.S. PATENT DOCUMENTS

| | | | |
|---|---|---|---|
| 8,196,868 B2 * | 6/2012 | Kutter .................. | B64G 1/1078 244/158.1 |
| 9,102,416 B1 * | 8/2015 | Cutler .................... | B64D 37/32 |
| 2003/0005718 A1 * | 1/2003 | Mitani .................... | B64D 13/06 62/402 |
| 2007/0054610 A1 * | 3/2007 | Jensen .................. | B64D 37/32 454/74 |
| 2007/0157614 A1 * | 7/2007 | Goldman .................. | F02C 3/22 60/641.15 |
| 2008/0060523 A1 | 3/2008 | Tom et al. | |
| 2008/0090510 A1 * | 4/2008 | Scherer .................. | B64D 13/06 454/71 |
| 2009/0227195 A1 * | 9/2009 | Buelow .................. | B01D 53/88 454/156 |
| 2010/0276545 A1 | 11/2010 | Chavagnac et al. | |
| 2015/0344145 A1 * | 12/2015 | Epstein .................. | B64D 37/30 |

\* cited by examiner

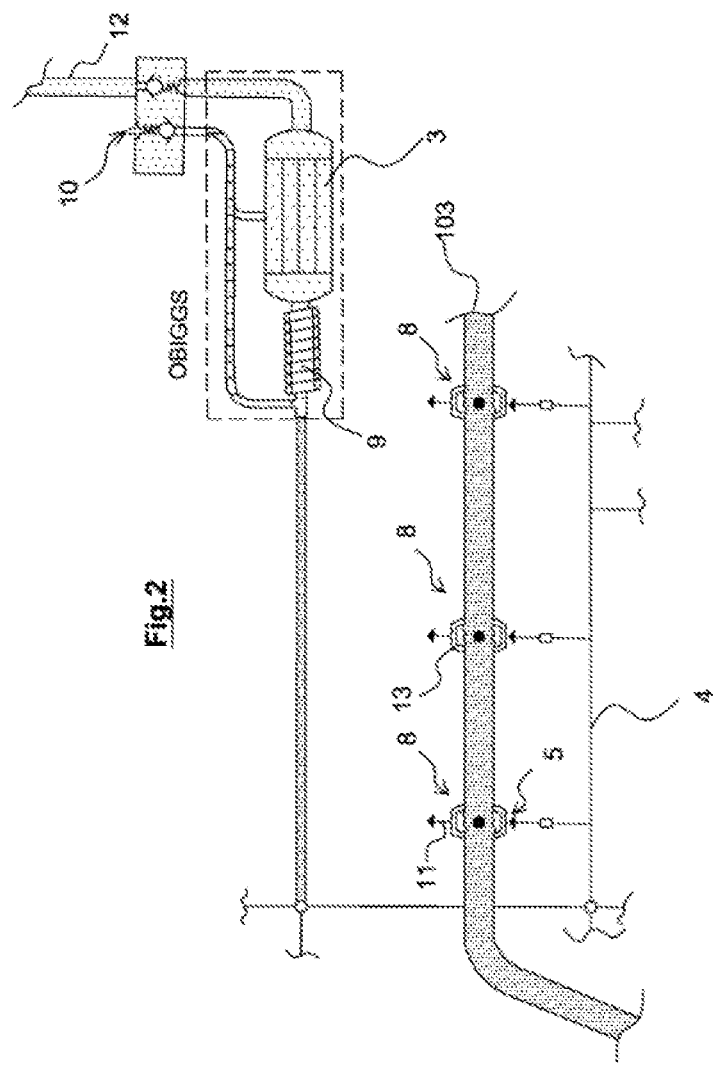

CRYOGENIC CIRCUIT CONDITIONING SYSTEM

CROSS REFERENCE TO RELATED APPLICATIONS

This application is the National Stage of International Application No. PCT/EP2014/051099, having an International Filing Date of 21 Jan. 2014, which designated the United States of America, and which International Application was published under PCT Article 21(s) as WO Publication No. 2014/0114628 A1, and which claims priority from, and the benefit of French Application No. 1350561, filed 22 Jan. 2013, the disclosures of which are incorporated herein by reference in their entireties.

BACKGROUND

1. Field

The presently disclosed embodiment relates to a system for conditioning and sweeping cryogenic propellant circuits of an aircraft.

In the context of the presently disclosed embodiment, an aircraft is understood to mean any vehicle able to move around in the earth's atmosphere and in space and that comprises at least one cryogenic fluid circuit notably for powering a rocket motor. It may notably be an aircraft with a hybrid aerodynamic and single-stage space flight, such as described in document FR 2 907 422 A1 in the name of the applicant company, a two-stage vehicle or a vehicle comprising a carrier airplane and a spaceplane launched from the carrier airplane.

2. Brief Description of Related Developments

The cryogenic propellant circuits used for the propellants of rocket motors, piping and ancillary devices notably of launchers or space aircraft cannot be left in contact with the ambient air because the moisture contained in this air freezes upon contact with the circuits.

In the case of very low temperature circuits, for example circuits carrying liquid hydrogen, the oxygen in the air will also be able to liquefy and build up, with the associated risks of fire and explosions that that implies.

Likewise, it is necessary to remove the gases derived from any leaks on these circuits and to avoid any contaminating of the environment surrounding the circuits with these gases.

In order to avoid these problems it is known practice to circulate nitrogen or helium continuously and at a pressure above atmospheric pressure around these circuits as long as the vehicle is on the ground. Such a method for protecting the cryogenic circuits by sweeping with a gas is known as conditioning.

Space launchers using cryogenic-propellant propulsion systems have a flight time through the atmosphere that is very short of the order of a few tens of seconds, thereby limiting the exposure of the circuits to atmospheric air during this flight.

The checking and conditioning of the environment of the cryogenic circuits is therefore carried out on the ground, right before the tanks are filled, using a conditioning circuit connected to the launcher. This conditioning continues until launcher takeoff but the conditioning-gas supply devices are disconnected upon launcher takeoff.

The conditioning circuit continuously sweeps the launcher zones containing cryogenic circuits and tanks with dry nitrogen in the event that the propulsion does not use liquid hydrogen, or helium when hydrogen is used, the nitrogen or the helium coming from an installation on the ground.

The conditioning circuits also collect any leaked propellant.

On the other hand, they no longer need to be fed with liquid during atmospheric flight of the launchers because the rapid ascent of these vehicles through the atmosphere leads to emptying of the internal compartments because of the rapid drop in external pressure.

This drop in pressure means that there is also no ingress of external air into the relevant compartments of these aircraft.

The situation of an aircraft of the spaceplane type using rocket motor propulsion using LOx/liquid methane cryogenic liquid propellants or semicryogenic liquid propellants with liquid oxygen is entirely different.

This is because a spaceplane will have a cruising phase lasting several tens of minutes in the atmosphere and it then becomes necessary to continue to sweep and condition the cryogenic propellant circuits during atmospheric flight.

Such a device and the associated conditioning gas become very penalizing in terms of dry weight both on account of the storage tanks and on account of the mass of conditioning gas.

SUMMARY

One aspect of the presently disclosed embodiment is a system which bleeds external air and extracts nitrogen therefrom in order to condition the cryogenic circuits at least during the phase of atmospheric flight of the aircraft.

This disclosed embodiment makes it possible to avoid carrying and storing conditioning gas onboard the vehicle.

To achieve this, the presently disclosed embodiment proposes a device for the in-flight conditioning of equipment of cryogenic circuits of an aircraft, comprising means for bleeding air from outside the aircraft, means for extracting nitrogen from this air using a nitrogen separator of the OBIGGS type and means for distributing this nitrogen around said components.

The distribution means advantageously comprise pressure-boosting means.

The conditioning device advantageously comprises means for distributing the nitrogen around the various equipment items of cryogenic circuits of the aircraft using a circuit of pipework equipped with calibrated orifices.

The device more particularly comprises means for encapsulating said equipment to receive the conditioning nitrogen.

The device of the disclosed embodiment is advantageously suited to the distributing of nitrogen around the items of equipment of the cryogenic circuits at least during a phase of atmospheric flight of the aircraft.

The bleed means are preferably situated on a compressor stage of a turbine engine with which the aircraft is equipped.

According to one alternative aspect, the bleed means draw air directly from outside the aircraft.

The device advantageously comprises drying means in the circuit downstream of the separator.

According to one particular aspect, the device supplements a nitrogen or helium circulation device external to the aircraft and used when the aircraft is on the ground.

The disclosed embodiment applies in particular to an aircraft comprising a rocket motor using one or more cryogenic propellant(s).

The aircraft is particularly of the spaceplane type comprising dual propulsion: an aerobic turbine engine and a rocket motor.

The disclosed embodiment further proposes a method for conditioning equipment of cryogenic circuits of an aircraft, which comprises a first step of conditioning equipment of cryogenic circuits of the aircraft on the ground using an external conditioning circuit connected to the aircraft, and a second step of in-flight conditioning of said equipment using a nitrogen-separation device of the disclosed embodiment.

BRIEF DESCRIPTION OF THE DRAWINGS

Further features and advantages of the disclosed embodiment will become apparent from reading the following description of nonlimiting exemplary aspects of the disclosed embodiment with reference to the drawings which depict:

FIG. 2 is a detail of FIG. 1.

DETAILED DESCRIPTION

Figure 1:
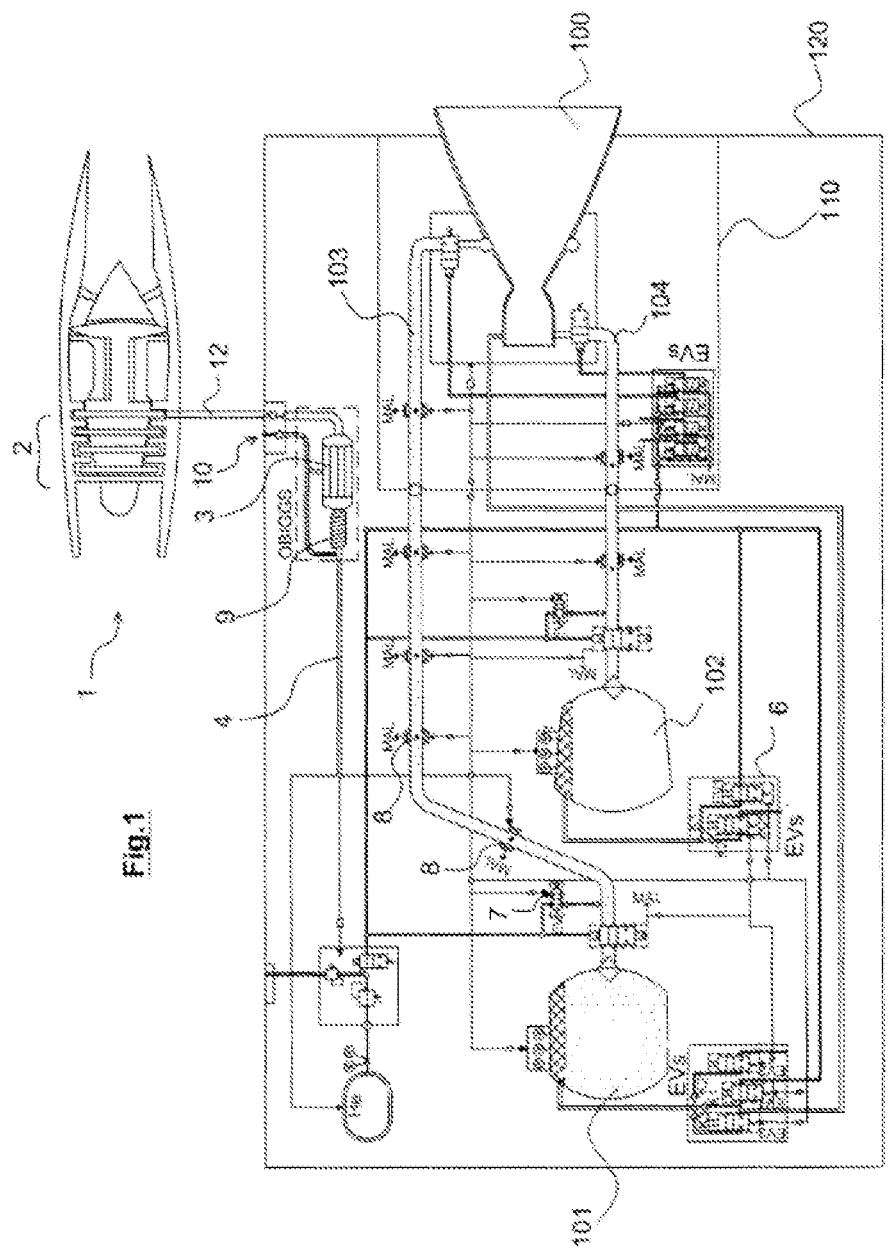
FIG. 1 is a schematic view of an aircraft equipped with a device according to one aspect of the disclosed embodiment.

The objective of the device of the disclosed embodiment is to eliminate moisture and oxygen from the environment surrounding the cryogenic propellant circuits for the propulsion of a rocket motor aircraft of the spaceplane type by filling compartments containing these circuits with nitrogen that remains gaseous at the liquefaction temperatures of the fuels and oxidants used.

This filling or conditioning notably avoids the deterioration of equipment such as valves, mechanical compensators and other devices such as gaiters or ball joints when this equipment becomes laden with ice because of the ambient moisture.

According to the aspect depicted in FIG. 1, the device comprises air bleed means in the form of an intake for bleeding air from a compressor stage 2 of the aeronautical engine 1 with which a spaceplane is equipped and comprises a nitrogen separator 3 of the OBIGGS ("On Board Inert Gas Generator System") type which may notably comprise a membrane type molecular filter.

OBIGGS devices are known devices supplied according to customer requirement notably by the French Company Air Liquide.

The bleed means here are situated on a final compressor stage of the turbine engine 1 with which the aircraft is equipped.

The choice of compressor stage depends on the pressure required for bleeding the gas.

As an alternative, the bleed may be taken from outside the vehicle via an air intake and the bleed means in this case draw air directly from outside the aircraft.

It is furthermore possible to position a heat exchanger on the bleed circuit in order to cool the bled air before it enters the OBIGGS.

The air from which the nitrogen is extracted is discharged to outside the aircraft by a valve 10.

The nitrogen separator 3 is potentially followed by a compressor and the stream of nitrogen is directed into a distribution circuit 4 in order to perform the conditioning and distribute the nitrogen around the various equipments carrying cryogenic fluids.

The distribution means comprise a circuit of piping and calibrated orifices in the region of the devices that are to be conditioned so as to deliver a quantity of nitrogen that corresponds to the requirements according to the volumes that are to be filled.

The design criterion for these orifices is that given the flow rate of the OBIGGS, the orifices are calibrated to keep the conditioned zones at an overpressure with respect to their surroundings so as to prevent the ingress of oxygen and damp ambient air around the cryogenic circuits.

It should be noted that because the pressure outside the aircraft decreases with altitude, the need for overpressure also decreases, making it possible potentially to limit the flow rate demanded of the device.

The separation performed by the OBIGGS device is normally suited to delivering nitrogen at a sufficiently low moisture content and oxygen content but a drying device may potentially be added in the circuit, this device comprising a discharge discharging the water to outside the aircraft for example via a valve 10.

The device of the disclosed embodiment, which uses no onboard nitrogen tank, offers a significant weight saving and therefore an improvement in performance by comparison with an aircraft that carries the conditioning gas.

In order to limit the volume of nitrogen that has to be generated, the various cryogenic fluid equipment, valves, filters, compensators are encapsulated within casings through which the nitrogen is swept.

The piping is, for example, double-walled piping with nitrogen circulating between the internal wall and the external wall thereof.

In the case of a thermally insulating external wall, the nitrogen and the external wall thermally insulate the piping.

It should be noted that in order not to have to supply excessive volumes of nitrogen with the onboard means, the device of the disclosed embodiment advantageously supplements a ground-based nitrogen circulation device external to the aircraft using which the conditioning volume is filled beforehand.

In this way, the device of the disclosed embodiment then merely has to compensate for the losses from the circuit once the aircraft is in flight and to distribute the nitrogen around the cryogenic circuits during the phase of atmospheric flight of the aircraft as a replacement for the volume of nitrogen escaping from the circuit.

It should be noted that the disclosed embodiment does not apply for a cryogenic fuel circuit containing liquid hydrogen, because in that case nitrogen, which will freeze, cannot be used.

The disclosed embodiment applies for example to a single-vehicle spaceplane with dual propulsion: turbojet engine and rocket motor.

FIG. 1 depicts a schematic example of such an aircraft comprising a device of the disclosed embodiment.

The aircraft is provided with a turbojet engine 1, from which the air used to extract the nitrogen is bled, is provided with a rocket motor 100, and is provided with tanks 101, 102 for cryogenic propellants distributed to the rocket motor by pipework 103, 104.

The aircraft fuselage interface is represented schematically by the box 120 and the rocket motor environment is represented schematically by the box 110.

The function of sweeping/conditioning during atmospheric flight is carried out by bleeding compressed external air 12, downstream of the compressor 2 of the turbojet engine of the spaceplane, then by separating the nitrogen using equipment 3 of the OBIGGS type.

The nitrogen is then conveyed at a very low moisture and oxygen content by a circuit of piping 4 comprising notably, according to FIG. 2, gas distribution orifices 5 which are calibrated in a manner appropriate to distributing the nitrogen around the various equipments 6, 7, 8 of the cryogenic circuits for example: electrically operated valves 6, 7, filters or compensators, cardan joints 8 on the cryogenic propellant piping 103, 104.

The equipments that are not incorporated into the casings are encapsulated in sleeves 13 to make it possible to reduce the volume of conditioning fluid needed.

According to the aspect, the OBIGGS device 3 is followed by drying means 9 and the outlet for wet gases 10 is exhausted to outside the aircraft.

At the end of the circuit, the conditioning nitrogen is exhausted 11 in the region of the encapsulated components 6, 7, 8 so that there is always gas being swept around these components.

The design of the circuit, the volumes of the sleeves 13 and the calibration of the gas distribution orifices 5 and of the leaks allows control over the pressure so as to ensure that the flow of conditioning gas is in the direction from OBIGGs source toward the exhaust or exhausts of the conditioning circuit without ambient air entering the zones that are to be protected.

It will be noted that if the aircraft is a two-stage vehicle, with a first stage comprising the turbojet engine and the second stage comprising the rocket motor, then an automatic connect/disconnect device needs to be provided on the line 12 to disconnect and close off the circuits upon stage separation.

The same is true of a system using a carrier airplane and a spaceplane launched from the carrier airplane.

Aside for preventing freezing and deposits of ice on the equipments or components of the cryogenic circuits which is achieved by the conditioning afforded by the device of the invention, this conditioning is also accompanied by a thermal regulation effect; for example, maintaining the temperature of certain sensitive electrical equipment. This is achieved by the gas used which opposes the cooling due to the vicinity of the cryogenic lines throughout the atmospheric flight of the aircraft.

The disclosed embodiment is not restricted to the example depicted and, notably according to one particular aspect, the residual moisture in the nitrogen can be condensed by passing through an exchanger with the propellant lines at cryogenic temperature and collected or solidified in a suitable zone. The cooled nitrogen thus limits exchanges of heat with the propellants when it is being used in the conditioning circuit.

What is claimed is:

1. A device that is configured for in-flight conditioning of cryogenic circuits equipment of an aerospace vehicle, which distributes cryogenic fluids from at least one tank to an engine of the aerospace vehicle, the device comprising:
   means for bleeding air from outside of the aerospace vehicle during an atmospheric part of a flight comprising an intake that is configured to bleed air from a compressor of a turbine engine of the aerospace vehicle;
   means for extracting nitrogen from the air using a nitrogen separator of the OBIGGS type;
   means for distributing the nitrogen that is configured to surroundingly interface the nitrogen with the cryogenic circuits equipment, comprising a circuit of pipework having orifices that are disposed along said pipework and are calibrated to keep the cryogenic circuits equipment conditioned at an overpressure with respect to surrounds thereof, said orifices being located around the cryogenic circuits equipment and effecting a nitrogen gas sweep of the cryogenic circuits equipment with nitrogen; and
   drying mean located downstream of the nitrogen separator that include a discharge that is configured to dispense water to an exterior of the aerospace vehicle.

2. The device of claim 1, wherein said means for distributing the nitrogen comprise pressure-boosting means that include a compressor.

3. The device of claim 1, further comprising means that are configured to encapsulate the cryogenic circuits equipment that are at least one of casings and sleeves.

4. The device of claim 1, wherein the device is configured to distribute the nitrogen around the cryogenic circuits equipment that distribute the cryogenic fluids at least during a phase of the atmospheric part of the flight of the aerospace vehicle.

5. The device of claim 1, wherein the air intake directly draws in air from the outside the aerospace vehicle.

6. The device of claim 1, wherein the device supplements a conditioning circuit that is external to the aircraft and connected to the aerospace vehicle and that is configured to circulate one of nitrogen and helium.

7. An aircraft comprising:
   a rocket motor using at least one cryogenic propellant fluid; and
   device that is configured for in-flight conditioning of cryogenic circuits equipment of the aircraft, which distributes cryogenic fluids from at least one tank to an engine of the aircraft and comprises an air intake that is configured to bleed air from a compressor of a turbine engine outside of the aircraft during an atmospheric part of a flight an on board inert gas generator system (OBIGGS) type nitrogen separator that is configured to extract nitrogen from the air; means for distributing the nitrogen that is configured to surroundingly interface the nitrogen with the cryogenic circuits equipment, t-comprising a circuit of pipework having orifices that are disposed along said pipework and are calibrated to keep the cryogenic circuits equipment conditioned at an overpressure with respect to surrounds thereof, said orifices being located around the cryogenic circuits equipment and effecting a nitrogen gas sweep of the cryogenic circuits equipment with nitrogen; and drying mean located downstream of the nitrogen separator that include a discharge that is configured to dispense water to an exterior of the aircraft.

8. The aircraft of claim 7, wherein said aircraft further comprises an aerobic turbine engine so that the aircraft has dual propulsion formed by the rocket motor and the aerobatic turbine engine.

9. A method for conditioning cryogenic circuits equipment of an aerospace vehicle, the method comprising:
   connecting an external conditioning circuit on the ground to the aircraft and conditioning the cryogenic circuits equipment; and
   providing in-flight conditioning of said cryogenic circuits equipment using an device that is configured for in-flight conditioning of cryogenic circuits equipment of the aircraft, which distributes cryogenic fluids from at least one tank to an engine of the aerospace vehicle and comprises an air intake that is configured to bleed air from a compressor of a turbine engine outside of the aerospace vehicle during an atmospheric part of a flight an on board inert gas generator system (OBIGGS) type nitrogen separator that is configured to extract nitrogen from the air; means for distributing the nitrogen that is configured to surroundingly interface the nitrogen with the cryogenic circuits equipment, comprising a circuit of pipework having orifices that are disposed along said pipework and are calibrated to keep the cryogenic circuits equipment conditioned at an overpressure with respect to surrounds thereof, said orifices being located around the cryogenic circuits equipment and effecting a nitrogen gas sweep of the cryogenic circuits equipment with nitrogen; and drying mean located downstream of the nitrogen separator that include a discharge that is configured to dispense water to an exterior of the aerospace vehicle.

10. An device that is configured for in-flight conditioning of cryogenic circuits equipment of an aerospace vehicle by distributing cryogenic fluids from at least one tank to an engine of said aerospace vehicle, the device comprising:
- an intake that is configured to bleed air from a compressor of a turbine engine of the aerospace vehicle;
- an on board inert gas generator system (OBIGGS) type nitrogen separator;
- a circuit of nitrogen distribution pipework that is equipped with orifices that are disposed along said pipework and calibrated to keep the cryogenic circuits equipment at an overpressure with respect to surroundings thereof, said orifices being located around the cryogenic equipment, said circuit of nitrogen distribution pipework carrying nitrogen at said calibrated orifices, said calibrated orifices effecting local nitrogen gas sweep of the cryogenic circuits equipment with nitrogen; and
- drying means located downstream of the nitrogen separator, said drying means including a discharge that is configured to dispense of water to an outside of the aerospace vehicle.

11. The device of claim 10, further comprising means for encapsulating the cryogenic circuits equipment that includes at least one of casings and sleeves.

12. The device of claim 10, wherein the device is configured to distribute conditioned nitrogen around the cryogenic circuits equipment that distribute the cryogenic fluids at least during a phase of atmospheric flight of the aerospace vehicle.

13. The device as claimed in claim 10, wherein the device supplements a ground device that is configured to condition circuits external to the aerospace vehicle by circulating one of nitrogen and helium.

14. An aircraft, comprising:
- a rocket motor having at least one cryogenic propellant fluid; and wherein said aircraft is an aerospace vehicle that comprises a device that is configured for in-flight conditioning of cryogenic circuits equipment of the aircraft by distributing cryogenic fluids from at least one tank to an engine of said aircraft, the device comprising an intake that is configured to bleed air from a compressor of a turbine engine of the aircraft an on board inert gas generator system (OBIGGS) type nitrogen separator; a circuit of nitrogen distribution pipework that is equipped with orifices that are disposed along said pipework and calibrated to keep the cryogenic circuits equipment at an overpressure with respect to surroundings thereof, said orifices being located around the cryogenic equipment, said circuit of nitrogen distribution pipework carrying nitrogen at said calibrated orifices, said calibrated orifices effecting local nitrogen gas sweep of the cryogenic circuits equipment with nitrogen; and a discharge that is configured to dispense of water to an outside of the aerospace vehicle aircraft.

15. The aircraft of claim 14, further comprising an aerobic turbine engine so that said aircraft has dual propulsion formed by the rocket motor and the aerobic turbine engine.

16. A method for conditioning cryogenic circuits equipment of an aerospace vehicle, the method comprising the following steps:
- conditioning the cryogenic circuits equipment of the aerospace vehicle on the ground using an external conditioning circuit connected to the aerospace vehicle; and
- performing in-flight conditioning of said cryogenic circuits equipment using a device that is configured for in-flight conditioning of cryogenic circuits equipment of the aerospace vehicle by distributing cryogenic fluids from at least one tank to an engine of said aerospace vehicle, the device comprising an intake that is configured to bleed air from a compressor of a turbine engine of the aerospace vehicle; an on board inert gas generator system (OBIGGS) type nitrogen separator; a circuit of nitrogen distribution pipework that is equipped with orifices that are disposed along said pipework and calibrated to keep the cryogenic circuits equipment at an overpressure with respect to surroundings thereof, said orifices being located around the cryogenic equipment, said circuit of nitrogen distribution pipework carrying nitrogen at said calibrated orifices, said calibrated orifices effecting local nitrogen gas sweep of the cryogenic circuits equipment with nitrogen; and a discharge that is configured to dispense of water to an outside of the aerospace vehicle aircraft.

* * * * *